UNITED STATES PATENT OFFICE.

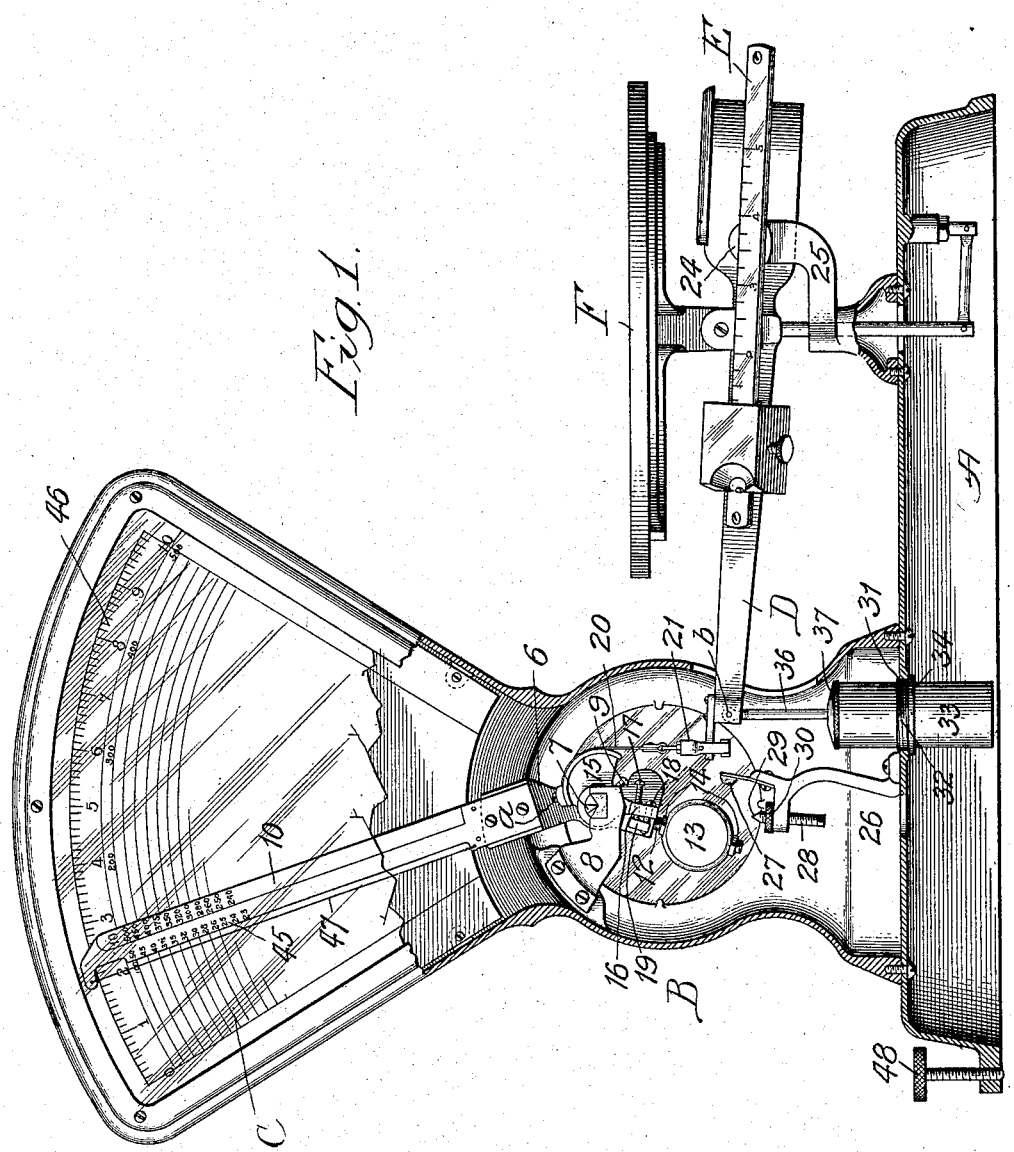

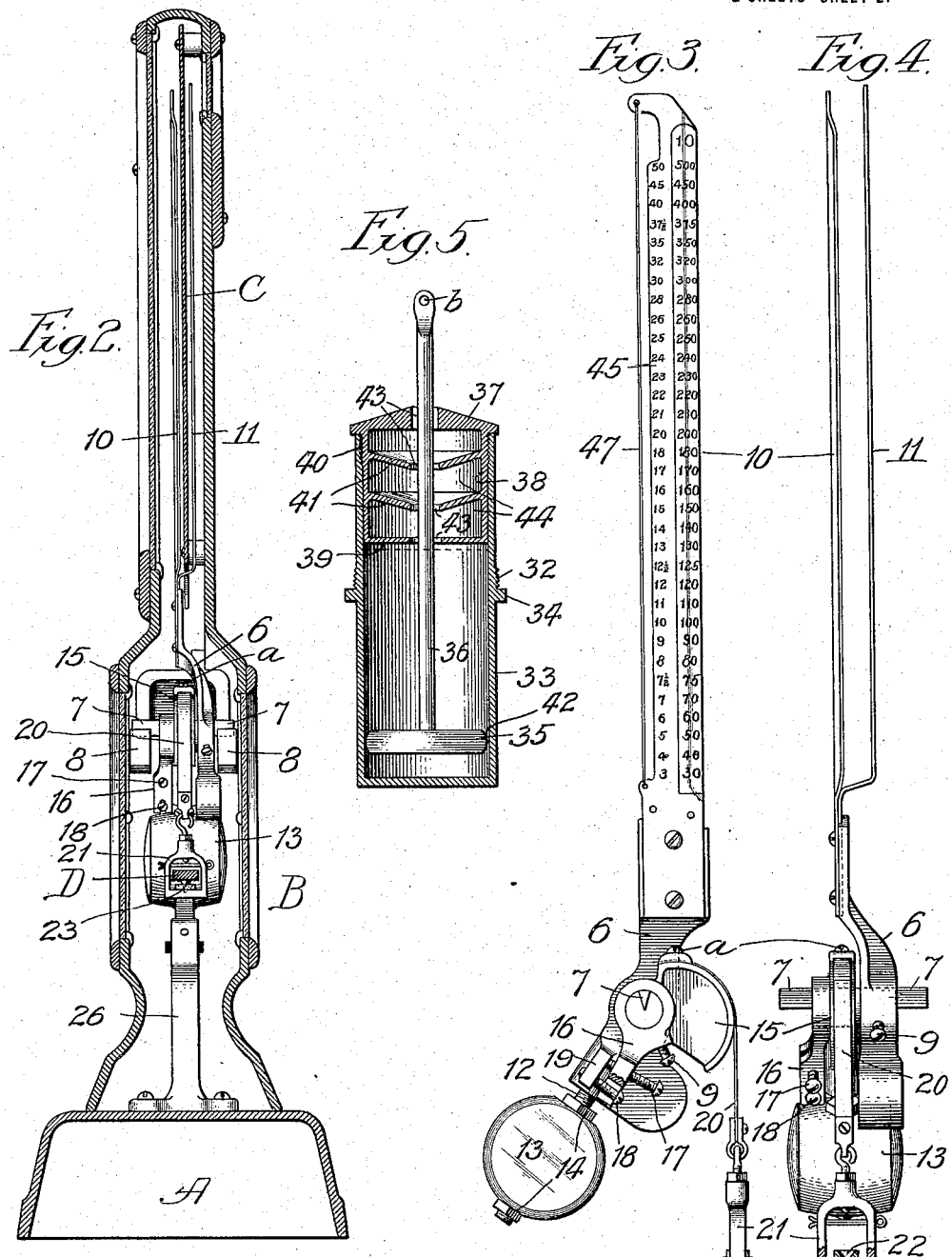

CHARLES G. STRUBLER, OF ELKHART, INDIANA, ASSIGNOR TO STRUBLER COMPUTING SCALE COMPANY, OF ELKHART, INDIANA, A CORPORATION OF INDIANA.

SCALE.

1,168,686.            Specification of Letters Patent.       Patented Jan. 18, 1916.

Application filed March 18, 1909, Serial No. 484,196. Renewed June 1, 1915. Serial No. 31,624.

*To all whom it may concern:*

Be it known that I, CHARLES G. STRUBLER, a citizen of the United States, residing at Elkhart, in the county of Elkhart and State of Indiana, have invented certain new and useful Improvements in Scales, of which the following is a specification.

This invention relates to improvements in scales and more especially to the automatic computing type; and has for one of its objects, to provide a construction and operation that will prevent undue vibration of certain movable parts, so that the weight and price of an article may be positively and accurately registered.

Another object is to lessen the friction and impart a more sensitive action to the movable parts.

Other objects and advantages will appear hereinafter.

Figure 1 is a front elevation and part section embodying the improved features. Fig. 2 is a vertical transverse section. Fig. 3 is a detached front elevation of the indicating hands and the actuating mechanism to which they are connected. Fig. 4 is a view taken at right angles thereto. Fig. 5 is a vertical longitudinal section of a dash-pot attachment.

In the drawing A represents a hollow base; B a standard mounted thereon; C a computing chart or dial framed in the upper part of said standard; D the main scale beam; E the tare beam; and F the weighing platform.

A lever rocking-arm 6 is mounted on a knife edge pivot shaft 7, having its respective ends supported in companion brackets 8, secured to the stand B, as best shown in Figs. 1 and 2. The rocking-arm 6 is adjustably secured to shaft 7 by a set-screw 9 which permits of the arm being turned on its axis and the same adjusted to a correct working position. The lower ends of the indicating hands 10 and 11 are secured to the upper end of arm 6. This arm is provided with a screw-rod 12 extending downward from the lower end thereof, on which is threaded a pendulum weight 13. This weight may be moved up or down in securing the proper counter balancing adjustment and is locked in place by means of nuts 14.

A cam or eccentric 15 is mounted on pivot-shaft 7 and has an arm 16 extending downward therefrom, as best shown in Fig. 3. This arm has the screws 17 and 18 inserted therethrough. The locking-screw 17 threads against a lug 19 formed on the lever arm 6. The adjusting screw 18 threads in the lug but not in the arm. By slacking back on screw 17 and then turning screw 18, either in or out, the position of the arm 16 is changed accordingly and changes the relative position of the cam 15 in fixing the position of the indicating hands so that they will register accurately. The screws 18 and 17 are both located on the same side so as to be easily accessible and provide for a more accurate and minute adjustment.

One end of a strap 20 is secured to the cam 15 as at $a$ and extends downward over the periphery of the same and has a stirrup 21 suspended from the lower end thereof, as best shown in Figs. 3 and 4. A conical socket-bearing 22 is removably inserted in the lower end of the stirrup for the reception of the conical pivot point 23, secured to the adjacent end of the main scale beam D, extending into the stirrup, as shown in Figs. 1 and 2. In this instance, the socket-bearing 22, is composed of agate which will not corrode or be affected by atmospheric changes and thus provide a more positive and sensitive action at all times, than is possible, under ordinary conditions.

The main scale-beam D is provided with a proper fulcrum bearing 24, in a double bracket 25 extending upward from the base on opposite sides. The tare-beam is also mounted on the same pivotal bearing 24.

The lower end of a bracket 26 is secured to the base and extends upward therefrom and has a buffer 27 mounted on the upper end thereof, which receives the impact of the lever arm balance weight and limits the movement of the same. A screw 28 is threaded in a part of the bracket 25 and is provided with a conical point 29 adapted to engage the lower end of the screw-rod 12, to lock the vibrating parts against movement when the scales are being stored or packed for shipment. A nut 30 locks the screw 28 against accidental movement.

The hollow base is provided with a threaded aperture 31 for the engagement of the threaded part 32 of a dash-pot cylinder 33, as shown in Figs. 1 and 5. In assembling, the dash-pot is inserted from the underside, the annular shoulder 34 coming to a stop against the base and fixes the relative position of the same, as shown in Fig. 1. The dash-pot piston 35 is mounted on the inner end of a piston-rod 36, the outer end extending out through a removable cap 37, and has a pivotal connection with the scale-beam D, as at *b*. The cap 37 has a cylindrical extension 38 which telescopes down on the inside of the dash-pot cylinder for a portion of its length and has a closing bottom end 39. The cap extension has a threaded engagement 40 with the cylinder 33 and screws lightly into place. The cap-extension is provided with a plurality of diaphragms 41 which are perforated, as is the cap-end 37 and the bottom end 39, for the passage therethrough of the piston rod. An annular space 42 is provided for between the piston and the surrounding cylinder wall and allows for a restricted flow of the fluid contents. It will be noted that the perforations 43 in the bottom end of cap 37 and the diaphragms 41 are somewhat larger than is necessary for a free movement of the piston-rod, and provides for a limited flow of the fluid up into and down out of the chambers 44 in accordance with the movement of the piston.

The purpose of the diaphragm feature is to retard and check a too sudden movement of the body of liquid and piston and thereby prevent a reciprocating vibration of the parts acted upon by the dash-pot.

In addition to the bottom-closure of the cap-extension, two diaphragms are shown, but it is obvious that a greater or less number can be used as practical working may require. In this instance two indication hands are employed and located on opposite sides of the computing chart, the hand 10 moving across the front or face side of the chart and hand 11 registering on the opposite side in connection with a graduated scale, not shown, whereby the customer standing on the opposite side from that of the vender is enabled to read the weight of the goods being purchased. The indicating hand 10, is provided with the usual numerical scale 45 which will in connection with numerals on the chart, (not shown in this instance) give the per pound price of the article being vended. The top graduated scale 46 indicates the weight of the article. The hand is moved across the face of the chart from its zero or normal position by the load on the platform which acts through the connecting actuating mechanism before described. A fine wire 47 has its respective ends secured to the upper and lower ends of the indicator hands and extends along one edge thereof and is spaced apart therefrom as shown in Figs. 1 and 3. This wire will be the proper indicating guide and insures a positive and correct reading of the scale at a glance. It also insures a fine and close adjustment of the actuating mechanism. A screw 48 is inserted down through the base and is for the purpose of leveling the scale on its supporting surface.

Having thus described my invention, what I claim is:—

1. In a scale, a pivot-shaft, a lever rocking-arm movably mounted thereon, the companion indicator hands secured to said rocking-arm in working relation, a pendulum weight operatively connected with said rocking-arm, a cam provided with an arm extending downward therefrom and mounted on said shaft, and means for changing the relative position of said cam and the lever rocking arm.

2. In a scale, a pivot-shaft, a lever-arm adjustably mounted thereon, a cam having an arm extension, a screw inserted through said arm and threaded in a part of said lever-arm, whereby the position of said cam may be relatively changed with reference to the lever arm, and a second screw inserted through the cam-arm and having a locking bearing on said lever-arm for locking said cam in the required position.

3. In a scale, a lever-rocking-arm, a cam mounted on an axis common to said arm, the indicating hands secured to one end of said rocking arm, a strap secured to said cam, a stirrup suspended from said strap, a conical agate socket bearing inserted in said stirrup, and the scale beam extending into said stirrup and provided with a conical point adapted to engage said socket bearing.

4. In a scale, a base, a bracket fixed thereon, a buffer secured to the upper end thereof, the rocking-arm and a screw set in said bracket and adapted to engage said arm and lock the same against movement.

5. In a scale, a pivot shaft, a lever-arm adjustably mounted thereon, a cam having an arm extension, a screw inserted through said arm and threaded in a part of said lever-arm, whereby the position of said cam may be relatively changed with reference to the lever arm, and a second screw inserted through the cam-arm and having a locking bearing on said lever-arm for locking said cam in the required position.

6. In a scale, a base, a bracket fixed thereon, a buffer secured to the upper end thereof, the rocking-arm, and a screw set in said bracket and adapted to engage said arm and lock the same against movement.

7. In a scale, a pivot shaft, a lever arm, mounted thereon, with means whereby it may be angularly adjusted on the shaft and locked in adjusted positions, an eccentric mounted also on said shaft, a counterbalancing arm extending downwardly from said lever arm and means whereby the position of said eccentric may be angularly shifted relatively to said lever arm and locked in adjusted positions.

8. A price computing scale comprising a base, a standard rising therefrom and carrying a computing chart, a swinging indicator to sweep the chart, a pivot shaft mounted in the standard, an angularly adjustable rocking lever arm mounted thereon to which the indicator is attached, an eccentric mounted also in said shaft, a counterbalancing downwardly extending arm carried by the lever arm, means for angularly shifting the eccentric relatively to the lever arm, a scale beam pivotally supported on the base, a flexible connection between one end of the beam and said eccentric, a dash pot connected to said scale beam near the latter end of said beam, and a commodity support supported on said beam.

9. A price computing scale comprising a base, a standard, a computing chart carried thereby, an indicator to sweep said chart, a pivot shaft, a rocking lever arm mounted thereon and having a counterbalancing weight, a cam having an arm extension, adjusting and locking means whereby the cam may be angularly adjusted relatively to the lever arm, comprising a screw threaded through the cam arm extension and bearing against the lever arm and a second screw loosely extending through the cam arm extension and lockingly engaging the lever arm, a scale beam pivoted to the base and carrying a commodity support, and flexible means connecting the inner end of the scale beam to the said eccentric.

10. In a scale, a base, a standard rising therefrom, a chart carried by said standard, an indicator sweeping said chart, a pivot shaft, a rocking lever arm fixed to the shaft by which said indicator is carried, a pendulum carried by the lever arm, an eccentric mounted on said shaft, with means to angularly adjust it relatively to said arm, a scale beam with flexible means to connect it to said eccentric and a combined buffer and locking device for said pendulum.

11. In a scale, a pivoted scale beam with a commodity support thereon, a pivot shaft, a rocking lever arm mounted thereon, an eccentric mounted also on said shaft and having an extension arm, a screw inserted loosely through the eccentric arm and threaded into said lever arm, whereby the position of the cam may be angularly changed relatively to said lever arm, a second screw threaded in the eccentric arm and bearing against said lever arm and a flexible connection between said eccentric and the inner end of said scale beam.

In testimony whereof I affix my signature in presence of two witnesses.

CHARLES G. STRUBLER.

Witnesses:
L. B. COUPLAND,
M. J. KIRKLAND.